(12) United States Patent
Nakazawa

(10) Patent No.: US 9,001,346 B2
(45) Date of Patent: Apr. 7, 2015

(54) SIGNAL PROCESSING CIRCUIT, IMAGE SCANNER, AND IMAGE FORMING APPARATUS

(75) Inventor: Masamoto Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 363 days.

(21) Appl. No.: 13/397,100

(22) Filed: Feb. 15, 2012

(65) Prior Publication Data

US 2012/0224205 A1    Sep. 6, 2012

(30) Foreign Application Priority Data

Mar. 3, 2011    (JP) .................. 2011-046294

(51) Int. Cl.
*G06K 15/00* (2006.01)
*H04N 1/00* (2006.01)
*H04N 1/10* (2006.01)

(52) U.S. Cl.
CPC ....... *H04N 1/00896* (2013.01); *H04N 1/00928* (2013.01); *H04N 1/1013* (2013.01); *H04N 2201/04772* (2013.01); *H04N 2201/04774* (2013.01)

(58) Field of Classification Search
CPC combination set(s) only.
See application file for complete search history.

(56) References Cited

U.S. PATENT DOCUMENTS

| 7,821,682 | B2 | 10/2010 | Nakazawa et al. | |
|---|---|---|---|---|
| 2006/0203306 | A1* | 9/2006 | Hoshi | 358/497 |
| 2007/0127091 | A1* | 6/2007 | Hiranuma | 358/500 |
| 2007/0188638 | A1 | 8/2007 | Nakazawa et al. | |
| 2008/0252787 | A1 | 10/2008 | Nakazawa et al. | |
| 2010/0027061 | A1 | 2/2010 | Nakazawa | |
| 2010/0171998 | A1 | 7/2010 | Nakazawa | |
| 2011/0026083 | A1 | 2/2011 | Nakazawa | |
| 2011/0051201 | A1 | 3/2011 | Hashimoto et al. | |
| 2011/0063488 | A1 | 3/2011 | Nakazawa | |
| 2012/0008173 | A1 | 1/2012 | Konno et al. | |

FOREIGN PATENT DOCUMENTS

| JP | 2004-017298 A | 1/2004 |
|---|---|---|
| JP | 2009145738 A | 7/2009 |

OTHER PUBLICATIONS

Chinese Office Action dated Mar. 3, 2014 for corresponding Chinese Application No. 201210050019.8.

* cited by examiner

*Primary Examiner* — Tammy Pham
*Assistant Examiner* — Idowu O Osifade
(74) *Attorney, Agent, or Firm* — Harness, Dickey & Pierce, P.L.C.

(57) ABSTRACT

A signal processing circuit includes a generator, a transmission unit, a control unit, and a mode selector. The generator generates a process-required signal. The transmission unit transmits the process-required signal to a unit disposed after the transmission unit. The control unit supplies respective control signal to the generator and transmission unit. The control unit includes a reference clock generator constantly operated for generating a reference clock signal when the signal processing circuit is operated. The mode selector selects and shifts an operating mode of the signal processing circuit between a first mode and a second mode. In the first mode, the generator and transmission unit are supplied with respective normal control signal from the control unit for a normal operation. In the second mode, the generator is supplied with a control signal different from the normal control signal, and the transmission unit is supplied with the same normal control signal.

14 Claims, 11 Drawing Sheets

FIG. 5
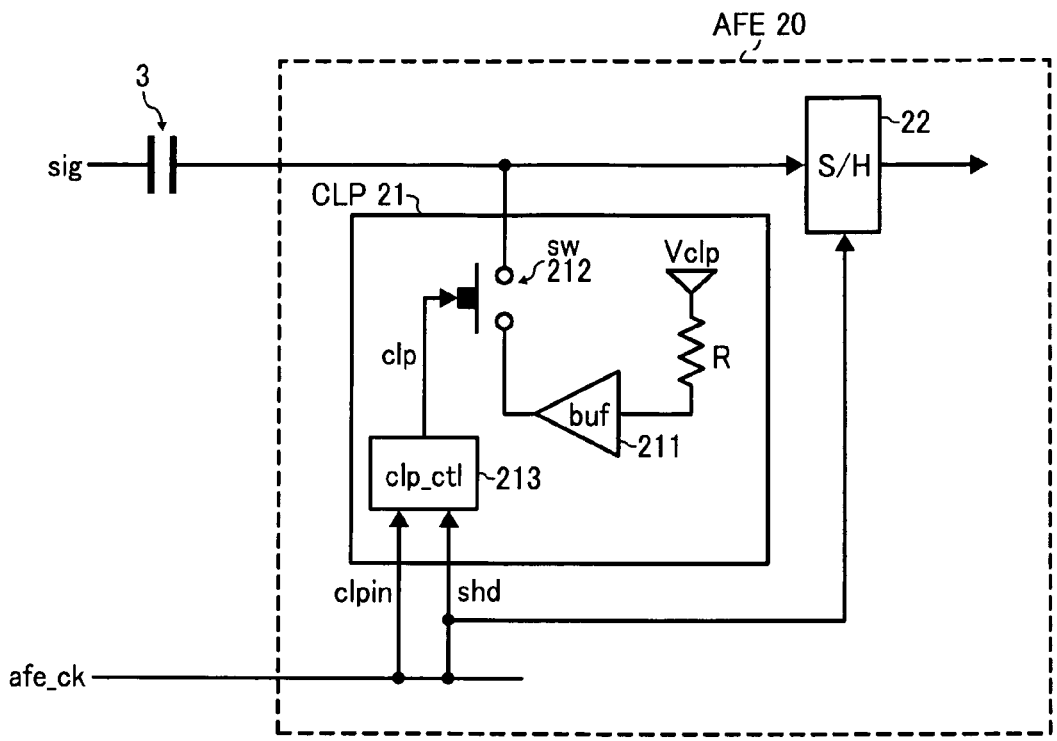
FIG. 6
NORMAL OPERATING MODE
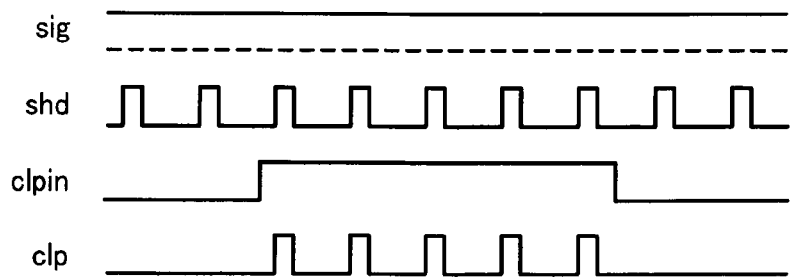
STANDBY MODE
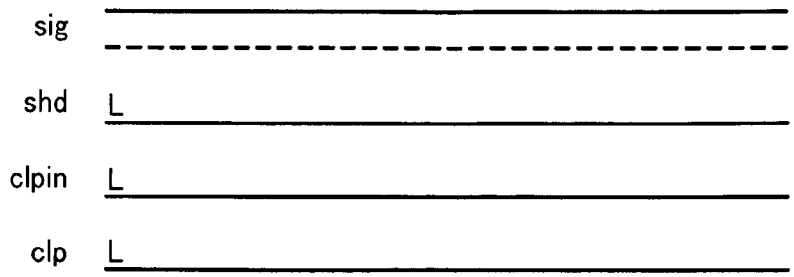

FIG. 7
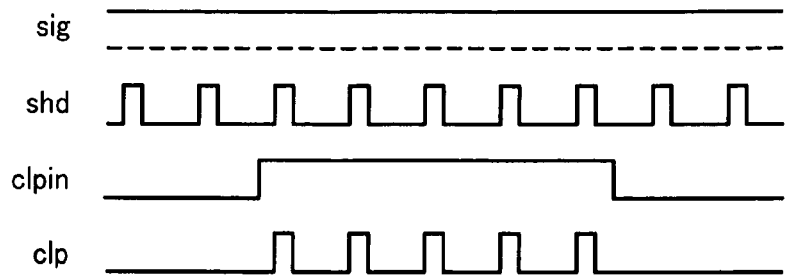
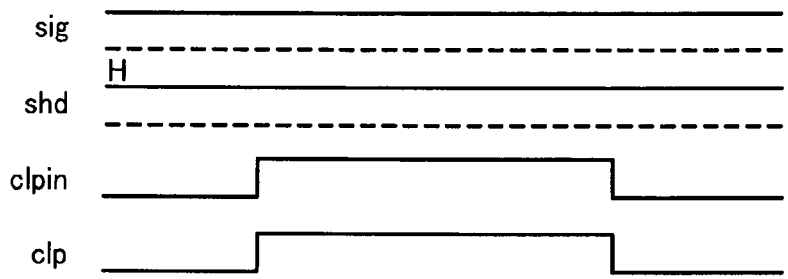
FIG. 8
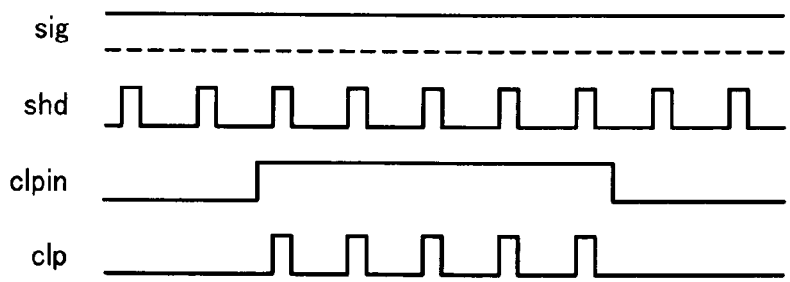
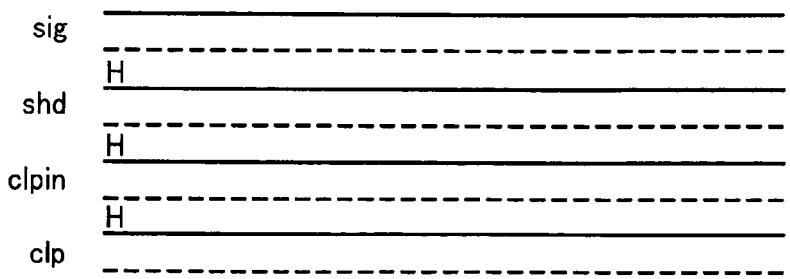

FIG. 9
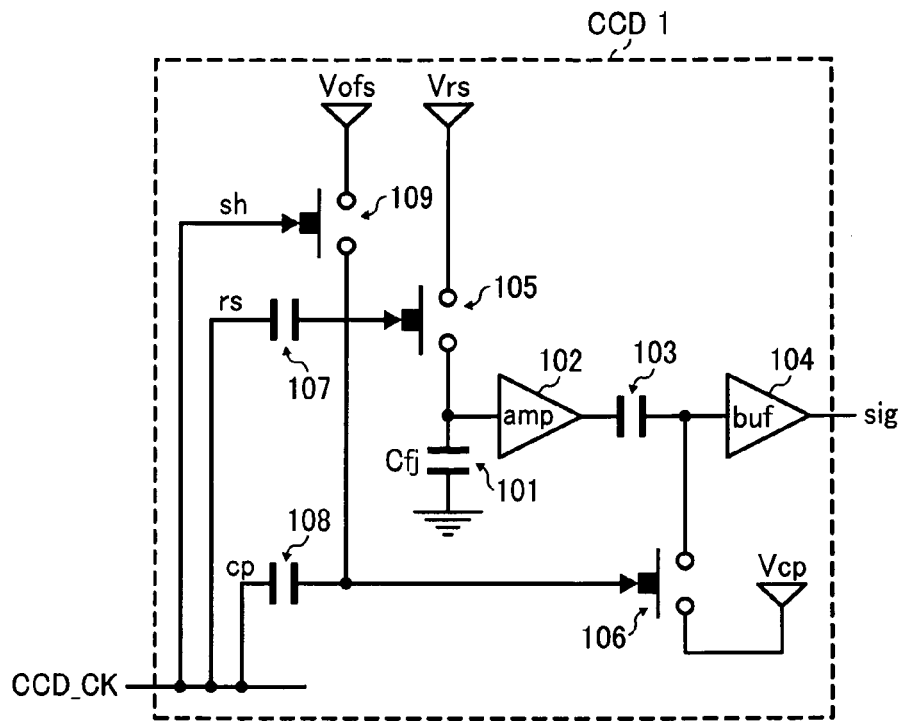
FIG. 10
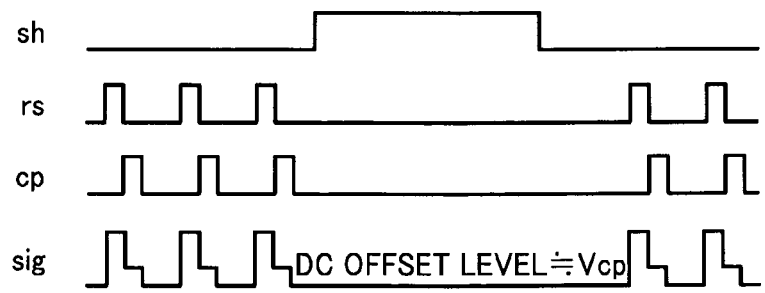
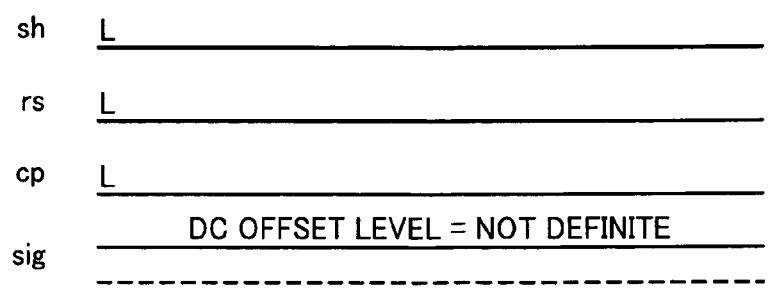

FIG. 11
NORMAL OPERATING MODE
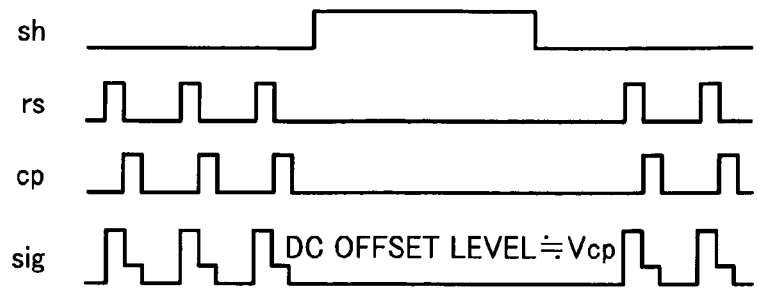
STANDBY MODE
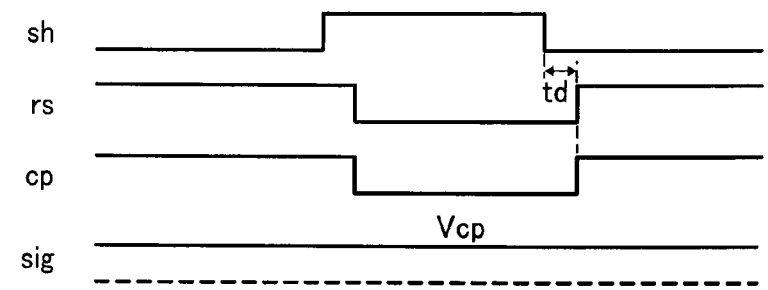
FIG. 12
NORMAL OPERATING MODE
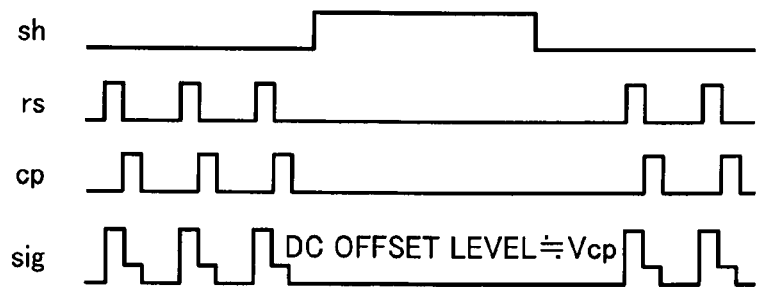
STANDBY MODE
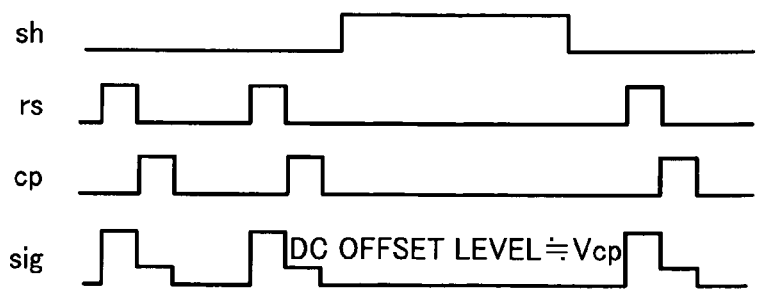

SIGNAL PROCESSING CIRCUIT, IMAGE SCANNER, AND IMAGE FORMING APPARATUS

CROSS-REFERENCE TO RELATED APPLICATION

This application claims priority to Japanese Patent Application No. 2011-046294 filed on Mar. 3, 2011 in the Japan Patent Office, which is incorporated by reference herein in its entirety.

BACKGROUND

1. Technical Field

The present invention relates to a signal processing circuit, unit such as a scanner; digital copier, a digital multi-functional apparatus, and a facsimile machine equipped with the signal processing circuit, an image scanner, and an image forming apparatus mounting the image scanning unit.

2. Description of the Background Art

Scanners are used to scan images from documents or the like. Specifically, light reflected from a document face-bearing an image thereon (hereinafter, "document image" or "document") is received by an image sensor such as a charge coupled device (CCD), and converted to electrical signals to obtain a scanned document image. In general, a scanner uses a plurality of operating modes, such as a scanning mode, a standby mode, and a reduced-power mode or energy saving mode.

The scanning mode denotes a state in which a scanning operation is conducted. The standby mode denotes a state in which a scanning operation is not conducted, but a power-ON condition is set for an apparatus, which means the apparatus as a whole is in normal operational condition. The reduced-power mode or energy saving mode denotes a state in which a power-OFF condition is set for the apparatus, in which only minimal power is supplied to the apparatus.

In actual use, the time that an apparatus is maintained in the standby mode is relatively longer than the time period of the scanning mode and/or reduced-power mode. Therefore, conventional image scanners continue to consume power during the standby mode unnecessarily, and overall power consumption is not reduced to the extent possible.

In view of such power consumption issue, a conventional control method sets apparatuses at the power-OFF condition during the standby mode similar to the reduced-power mode. Such a method can reduce power consumption during the standby mode. However, if the power-OFF condition is set for the standby mode, it is necessary to wait for register settings and circuit operation to stabilize when the power-ON condition is set again to return to the normal operating mode.

Further, because supply of clock signal and/or synchronization signal to one or more later-stage units is stopped during the standby mode (power-OFF), when the power-ON is resumed during the standby mode, it is necessary to wait for the operation of the later-stage units to stabilize when an instruction to return to the normal operating mode is received.

In view of such waiting time issue, JP-4064161-B discloses a configuration controlling the supply of signal that passes a phase-locked loop (PLL) circuit of a timing generator, in which signal supply from the PLL circuit can be set to ON or OFF. With such a configuration, the operating modes can be shifted without waiting for stabilization of the PLL circuit, enabling reduction of unnecessary power consumption and high speed shifting to the power supply mode.

However, because the method of JP-4064161-B stops the supply of clock signal and/or synchronization signal to later-stage units disposed after the timing generator, when an instruction to return to the normal operating mode is received during the standby mode, a long time is required to return to the normal operating mode.

SUMMARY

In one aspect of the present invention, a signal processing circuit is devised. The signal processing circuit includes a generator to generate a process-required signal; a transmission unit to receive the process-required signal from the generator and to transmit the process-required signal to a unit disposed after the transmission unit with a given control signal; a control unit to supply a control signal to the generator and a control signal to the transmission unit, the control unit including a reference clock generator being constantly operated for generating a reference clock signal when the signal processing circuit is operated; and a mode selector to select and shift an operating mode of the signal processing circuit between a first mode and a second mode. In the first mode, the generator is supplied with a normal control signal and the transmission unit is supplied with a normal control signal from the control unit for a normal operation of the signal processing circuit. In the second mode, the generator is supplied with a control signal different from the normal control signal used for the first mode, and the transmission unit is supplied with the same normal control signal used for the first mode.

In another aspect of the present invention, an image scanner is devised. The image scanner includes a photoelectric converter to photoelectrically convert light reflected from a document image to an image signal; a driving unit to drive the photoelectric converter; an analog processing unit to conduct direct current recovery of the image signal received from the photoelectric converter and to convert the received image signal to digital image data; a data transmitter to receive the digital image data from the analog processing unit and to transmit the digital image data to a unit disposed after the data transmitter with a given control signal; a reference clock generator, constantly being operated when the image scanner is operated, to generate a reference clock signal; a timing controller to supply a control signal to the driving unit, a control signal to the analog processing unit, and a control signal to the data transmitter; and a mode selector to select and shift an operating mode of the image scanner between a first mode and a second mode. During the first mode, the driving unit, the analog processing unit, and the data transmitter are supplied with respective normal control signal for a normal operation of the image scanner. During the second mode, the driving unit is supplied with a control signal different from the normal control signal used for the first mode, the analog processing unit is supplied with a control signal different from the normal control signal used for the first mode, and the data transmitter is supplied with the same normal control signal used for the first mode.

BRIEF DESCRIPTION OF THE DRAWINGS

A more complete appreciation of the disclosure and many of the attendant advantages and features thereof can be more readily obtained and understood from the following detailed description with reference to the accompanying drawings, wherein:

FIG. 5 shows a circuit diagram of an internal configuration of clamp shown in FIG. 4;

FIG. 6 shows a first example timing chart of operation pattern of the clamp shown in FIG. 5;

FIG. 7 shows a second example timing chart of operation pattern of the clamp shown in FIG. 5;

FIG. 8 shows a third example timing chart of operation pattern of the clamp shown in FIG. 5;

FIG. 9 shows a configuration of circuit diagram of an output circuit of CCD of FIG. 4;

FIG. 10 shows a first example timing chart of operation pattern of the output circuit of CCD shown in FIG. 9;

FIG. 11 shows a second example timing chart of operation pattern of the output circuit of CCD shown in FIG. 9;

FIG. 12 shows a third example timing chart of operation pattern of the output circuit of CCD shown in FIG. 9;

Figure 1:
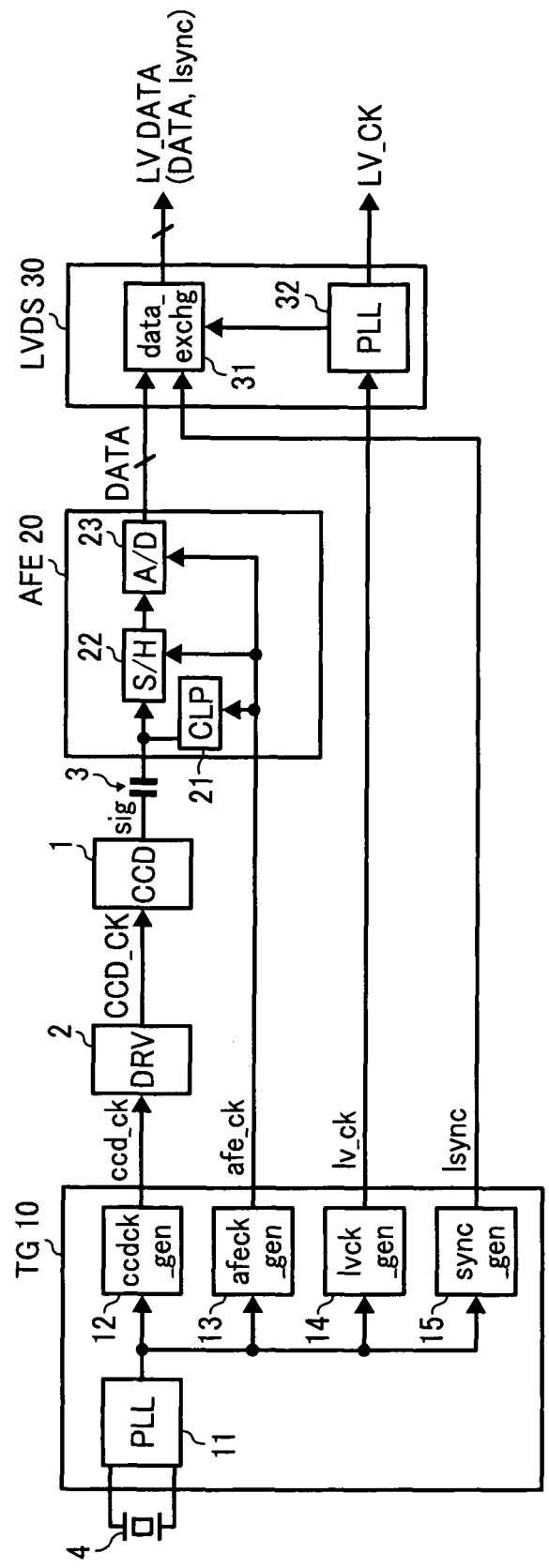
FIG. 1 shows a configuration of a circuit diagram of a conventional signal processing circuit for an image scanner.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to example embodiment is described hereinafter.

A description is given of a signal processing circuit according to an example embodiment. The signal processing circuit can be employed for an apparatus such as an image scanner having a drive mode and a stop mode. In the drive mode or normal operating mode, a load generating device such as a charge coupled device (CCD) is operated to conduct an image scanning operation, and in the stop mode, the operation of load generating device is stopped. Typically, a signal generated by one unit is transmitted or supplied to other unit, which may be disposed after the one unit. For example, clock signal and synchronization signal generated in the image scanner can be supplied to an image processing unit disposed after the image scanner. Such unit disposed after the image scanner may be generally referred to as a later-stage unit.

Figure 2:
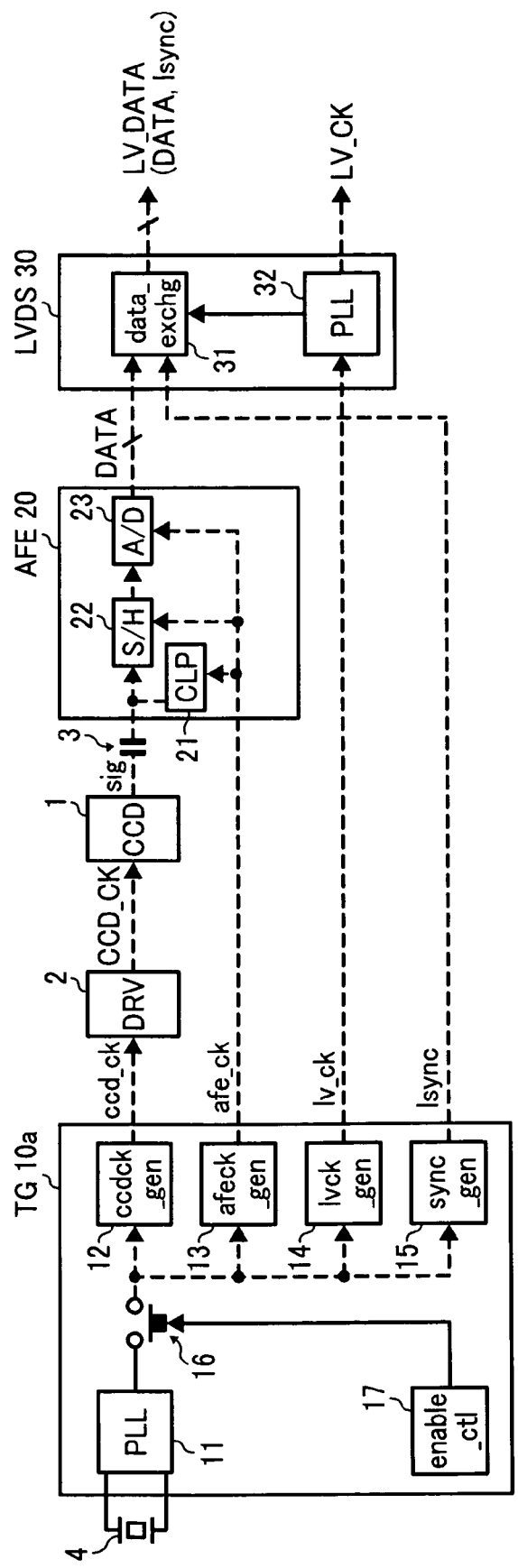
FIG. 2 shows other configuration of a circuit diagram of a conventional signal processing circuit for an image scanner.

For the sake of understanding of a circuit configuration of a signal processing circuit according to an example embodiment, a description is given of conventional signal processing circuits used for image scanners with reference to FIG. 1 and FIG. 2, showing two examples of circuit diagrams of signal processing circuits used for conventional image scanners.

An image scanner can be used to prepare or generate scanned images using a signal processing circuit. Specifically, light reflected from document image, and the light is photoelectrically converted to electrical signals or image signals by a photoelectric converter to prepare scanned image.

As shown in FIG. 1, a signal processing circuit used for image scanner includes a timing generator (TG) 10, a charge coupled device (CCD) 1, a CCD drive driver 2 (DRV 2), a capacitor 3, an analog front end (AFE) 20, and a low voltage differential signal (LVDS) transmitter 30. The TG 10 can be used as a timing controller or timing control unit. The CCD 1 can be used as a photoelectric converter. The DRV 2 drives the CCD 1. The capacitor 3 is provided for an analog processing unit such as the AFE 20, which is an analog processing (integrated circuit) IC. The LVDS 30 can be used as a data transmission unit or data transmitter.

The TG 10 includes a phase locked loop (PLL) circuit 11, a CCD drive clock generator (ccdck_gen) 12, an AFE drive clock generator (afeck_gen) 13, a LVDS clock generator (lvck_gen) 14, and a synchronization signal generator (sync_gen) 15.

The PLL 11 can be used as a reference clock generator. Specifically, the PLL 11 generates a reference clock based on an output of an oscillator (OSC) 4 transmitted to the PLL 11, in which the output of OSC 4 may be multiplied by a given number such as one, two, three or the like to prepare or generate the reference clock. The PLL 11 supplies the reference clock to the ccdck_gen 12, the afeck_gen 13, the lvck_gen 14, and the sync_gen 15. Based on the reference clock received from the PLL 11, each of such signal generators generates and outputs various control signals (e.g., clock signal, synchronization signal).

Each of the ccdck_gen 12 and the afeck_gen 13 can selectively output signals of clock/high/low at a given timing during one line scanning (i.e., scanning in a main scanning direction), wherein such timing can be designated by setting a start timing and signal period using a register. For example, each of the ccdck_gen 12 and the afeck_gen 13 can generate a clock signal based on the reference clock received from the PLL 11 during the normal operating mode, and the clock signal output from each of the ccdck_gen 12 and the afeck_gen 13 can be used to respectively control the CCD 1 and AFE 20 during the normal operating mode. Further, during the standby mode, the reference clock may not be input to the ccdck_gen 12 and/or the afeck_gen 13, and thereby the ccdck_gen 12 and/or the afeck_gen 13 may not control the CCD 1 and AFE 20 using clock signals. However, even if the reference clock is not input to the ccdck_gen 12 and/or the afeck_gen 13, each of the ccdck_gen 12 and the afeck_gen 13 can generate a gate signal (e.g., one time assert for one line) by combining high/low output, and such gate signal can be used to control the CCD 1 and AFE 20 during the standby mode.

The ccdck_gen 12 generates a CCD drive signal (ccd_ck) based on the reference clock received from the PLL 11, and outputs the ccd_ck signal to the DRV 2. Upon receiving the ccd_ck signal, the DRV 2 supplies a drive signal (CCD_CK) to the CCD 1 to drive the CCD 1.

The CCD 1, which may be a linear image sensor, photo-electrically converts light reflected from a document image to an analog image signal (sig) based on the CCD_CK signal received from the DRV 2, and outputs the analog image signal (sig). Such analog image signal (hereinafter referred to as an image signal or analog signal) can be input to the AFE 20, which is an analog processing IC, by conducting alternating current (AC) coupling using the capacitor 3.

The AFE 20 includes a clamp (CLP) 21, a sample hold (S/H) 22, and an analog/digital (A/D) converter 23. By using the CLP 21, the reference level of image signal input to the AFE 20 from the CCD 1 and the reference voltage in the AFE 20 are corresponded or matched. The S/H 22 conducts a sample hold of the input image signal, and extracts only a signal component. The A/D converter 23 converts the input analog signal or image signal to, for example, 10-bit digital data (DATA). The AFE 20 may further include a programmable gain amplifier (PGA), a black correction feedback loop, or the like.

The digital data (DATA) generated by the A/D converter 23 is input to the LVDS 30. The LVDS 30, useable as a data transmitter, includes a data exchanger (data_exchg) 31 and a PLL 32. The data_exchg 31 conducts a mapping process for DATA and line synchronization signal (lsync), output from the TG 10, to prepare LVDS data (LV_DATA), in which the DATA may be converted to prepare LVDS data (LV_DATA). Such LV_DATA may be output to a later-stage unit such as an image processing unit disposed after the image scanner.

Similar to the TG 10, the LVDS 30 includes the PLL 32. The PLL 32 generates an internal clock frequency based on the LVDS clock (lv_ck) output from the TG 10, and outputs a transmission clock (LV_CK) with the LVDS DATA (LV_DATA) to the later-stage unit such as image processing unit.

Image scanners may use a plurality of operating modes such as scanning mode, standby mode, and reduced-power mode. In the scanning mode, a scanning operation is conducted to scan images from documents or the like. The standby mode continues until a scan instruction is received. In the reduced-power mode, the power consumption is reduced to minimum power level for the image scanner. The scanning mode may also be referred to as "scan enabling mode," "normal operation condition," "normal operation," "normal condition," or "normal operating mode."

During the standby mode, the scanning operation is not conducted, but the power is still supplied to an image scanner, and thereby each unit of the image scanner may be at the normal operating mode. Therefore, although the scanning operation is not conducted during the standby mode, the power may be consumed at a level as similar to the scanning mode, which is unnecessary power consumption. Further, during the reduced-power mode, the power is not substantially supplied to the image scanner, by which power consumption of the image scanner can be reduced.

In general, after the percentage of the operation cycle occupied by the reduced-power mode of an image scanner or a digital multi-functional peripheral (MFP) apparatus, the percentage of the operation cycle occupied by the standby mode is greatest. Accordingly, it becomes important to reduce the power consumption during the standby mode to minimize power consumption of the apparatus or system as a whole.

The power consumption during the standby mode can be reduced by stopping the power supply to the image scanner by setting the power OFF-condition as similar to the reduced-power mode. However, when a scan operation instruction is received during the power OFF-condition (or standby mode), it is difficult to return to the normal operating mode promptly because the register setting for each unit of the image scanner is required, and the PLL circuit requires a given time to stabilize its circuit operation. Accordingly, it cannot be returned to the normal operating mode promptly.

In view of such problem, JP-4064161-B discloses a configuration shown in FIG. 2 to control the ON/OFF of clock output from a PLL circuit using a switch in an effort to achieve the reduction of power consumption and return to the normal operation with high speed. FIG. 2 shows the second mode or standby mode that the operation of the image scanner as a whole is stopped, in which the signal shown by a solid line is still supplied, and the signal shown by a dot line is not supplied.

In a configuration shown in FIG. 2, a first mode or normal operating mode can be set when the reference clock, which is the output of the PLL 11 of a TG 10a, is set ON by using an electronic switch 16 (or switch 16). Further, a second mode or standby mode can be set when the reference clock, which is the output of the PLL 11, is set OFF by using the switch 16, wherein the second mode includes at least one condition different from the first mode.

In the configuration of FIG. 2, the operation of each signal generators 12 to 15 in the TG 10a is stopped during the standby mode, and thereby the operation of later-stage units such as DRV 2, CCD 1, AFE 20, and LVDS 30 disposed after the signal generators 12 to 15 can be stopped, by which the power consumption can be reduced. The switch 16, disposed at the output end of the PLL 11, can be controlled by an enable controller (enable_ctl) 17.

Because the PLL 11 continues its operation during the standby mode, when the scan operation instruction is received during the standby mode and the output of the PLL 11 in the TG 10a is set ON by using the switch 16, each signal generators 12 to 15 in the TG 10a, and the later-stage units such as DRV 2, CCD 1, AFE 20, and LVDS 30 can be operated promptly without waiting the stabilization of operation of PLL 11. Further, because only the switch 16 in the TG 10a is controlled, the register setting of the TG 10a and the AFE 20 can be maintained, and thereby resetting of the register setting is not required.

However, the image scanner disclosed in JP-4064161-B may not be effective to return to the normal operating mode with high speed. Specifically, when the switch 16, disposed at the output end of the PLL 11 in the TG 10a, is set at OFF, the LVDS clock (lv_ck), the transmission clock (LV_CK), and the line synchronization signal (lsync) are not output to the later-stage units, which means if the lv_ck is not supplied to the PLL 32, the PLL 32 in the LVDS 30 does not conduct its operation. Therefore, when returning to the normal operating mode from the standby mode, the PLL 32 in the LVDS 30 requires some time to stabilize its operation (i.e. waiting time is required).

Further, an image processing unit may be typically disposed after the image scanner as the later-stage unit of the image scanner. The image processing unit conducts given processing such as correction of image data scanned by the image scanner. Such image processing unit may be operated based on the transmission clock (LV_CK) and the line synchronization signal (lsync) output from the LVDS 30 of the image scanner to the image processing unit, and the image processing unit uses such signals as reference signals for setting frequency of clock signal and various types of synchronization signal.

Accordingly, the operation of the image processing unit cannot be set at a proper level when the clock signal or line synchronization signal is not input to the image processing unit, in which overflow (or saturation) may occur to the register and circuit. If the input of clock signal and line synchronization signal are resumed under such condition, the operation may not be effectively returned to the normal operating mode. Instead, the operation may be returned to an abnormal operation condition, by which abnormal image may occur or system stop may occur when a scanning operation is conducted.

When the main power is supplied to an apparatus, the reset of circuit is conducted so that the apparatus is set operable, by which abnormal condition may not occur.

When returning to the normal operating mode from the standby mode, a reset can be also conducted for the image processing unit as similar to when the main power is supplied to the apparatus. However, if the reset is conducted when returning to the normal operating mode from the standby mode, data stored in the register is reset, and thereby the register setting is required, which means the return to the normal operating mode from the standby mode cannot be conducted with high speed.

Figure 4:
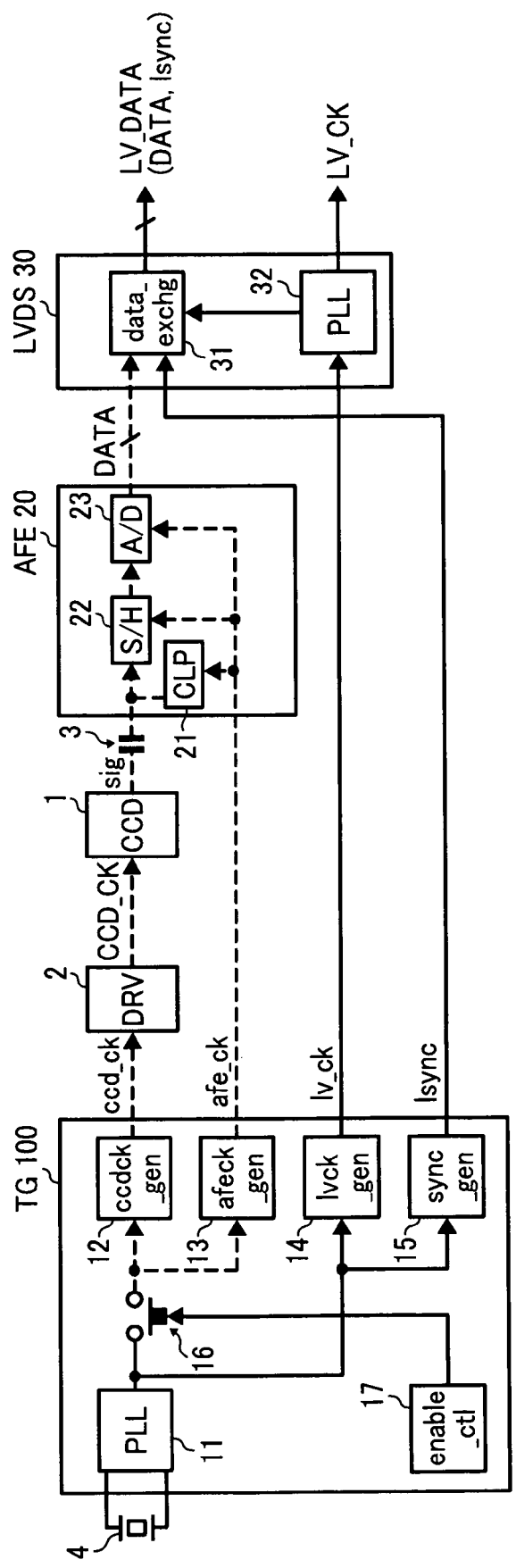
FIG. 4 shows a configuration of circuit diagram of signal processing circuit according to an example embodiment useable for an image scanner.

In view of such problem, in an example embodiment of the present invention, the output level of CCD (or direct current offset level) during the normal operating mode can be used for the standby mode. Referring now to the drawings, a description is given of a configuration of a signal processing circuit according to an example embodiment useable for an image scanner with reference to drawings. FIG. 4 is an example configuration of circuit diagram of a signal processing circuit according to an example embodiment. The parts or units same as FIGS. 1 and 2 are assigned with the same reference characters or numbers of FIGS. 1 and 2.

As for the image scanner according to an example embodiment, the LVDS 30 can output at least LV_CK to the later-stage unit during the standby mode. Further, the LVDS 30 may output LV_CK and LV_DATA to the later-stage unit during the standby mode.

In a TG 100 (see FIG. 4), the output of the PLL 11 can be set ON/OFF by using the switch 16 controllable by the enable controller (enable_ctl) 17. The switch 16 is interposed between the output end of the PLL 11 and the input end of the CCD drive clock generator (ccdck_gen) 12 and the input end of the AFE drive clock generator (afeck_gen) 13.

Further, the output end of the PLL 11 is connected to the LVDS clock generator (lvck_gen) 14 and the synchronization signal generator (sync_gen) 15, by which the output of the PLL 11 can be constantly supplied to the lvck_gen 14 and the sync_gen 15.

In the TG 100, the PLL 11 can be constantly operated. When the output of PLL 11 is set ON by the switch 16, the normal operating mode or first mode is set. In contrast, when the output of PLL 11 is set OFF by the switch 16, the standby mode or second mode is set.

With such a configuration, during the standby mode, the operation of the ccdck_gen 12 and the afeck_gen 13 are stopped, and the operation of the later-stage units such as DRV 2, CCD 1, and AFE 20 are also stopped, by which the power consumption can be reduced during the standby mode. Further, because the operation of the lvck_gen 14 and sync_gen 15 continue during the standby mode, the LVDS 30 can output and supply clock signal and line synchronization signal to the later-stage unit such as the image processing unit even during the standby mode, by which the image processing unit can be set at a condition similar to the normal operating mode of the image processing unit. As such, the switch 16 and the enable_ctl 17 can function as a mode selector to select and execute a mode.

As for the total power consumption of image scanner, the power consumption of DRV 2, AFE 20, and CCD 1 such as driving parts of CCD 1 is typically greater than the power consumption of other units. Further, the power consumption of the ccdck_gen 12 is relatively great after the power consumption of the DRV 2, the AFE 20, and the CCD 1. In contrast, the power consumption of other units such as the afeck_gen 13, the lvck_gen 14, and the LVDS 30 may be negligible level compared to the total power consumption of image scanner.

For example, the power consumption of the LVDS 30, driven by a constant current such as 3.5 mA (milliamperes), is typically at a level of several tens of mW (milliwatts), which is about one percent (1%) or so of the total power consumption of the image scanner that consumes several W (watt) to ten W (watt) or so. Therefore, even if the LVDS 30 and the lvck_gen 14 are being operated during the standby mode, the power consumption of the LVDS 30 and lvck_gen 14 may not affect the reduction of total power consumption of the image scanner.

Further, each of the PLL 11 in the TG 100 and the PLL 32 in the LVDS 30 are being operated during the standby mode. Therefore, when the scan operation instruction is received during the standby mode, and the output of PLL 11 is set ON by using the switch 16, both of the TG 100 and the LVDS 30 can be operated at the normal operating mode without waiting the operation stabilization of the PLL 11 and PLL 32, which means both of the TG 100 and the LVDS 30 can be returned to the normal operating mode with a short period time, and the operation of the ccdck_gen 12 and the afeck_gen 13 in the TG 100 can be started promptly. Therefore, the DRV 2, CCD 1, and AFE 20 disposed after the TG 100 as later-stage units can be returned to the normal operating mode promptly.

Further, because only the switch 16, provided after the PLL 11, is controlled, the register setting of the TG 100 and the AFE 20 can be maintained during the standby mode, and thereby the resetting of register setting is not required when returning to the normal operating mode from the standby mode.

Further, because the clock signal and the line synchronization signal can be constantly supplied from the image scanner to the image processing unit used as the later-stage unit, the image processing unit can be returned to the normal operating mode effectively from the standby mode, and thereby abnormal operation of the image processing unit can be prevented.

As above described, during the standby mode, the driving operation of load generating device such as DRV 2, CCD 1, and AFE 20, which consumes greater power is stopped, and only one or more units such as LVDS 30 that consumes small power is still operated, by which the image scanner can be returned to the normal operating mode effectively with high speed while reducing the power consumption when the scan operation instruction is received during the standby mode.

As such, the PLL 11 of the TG 100 can be constantly operated. During the normal operating mode or first mode, each of the DRV 2, the CCD 1, the AFE 20, and the LVDS 30 is supplied with corresponding control signal from the TG 100 based on the reference clock output from the PLL 11. For example, the TG 100 supplies the ccd_ck signal to the DRV, the afe_ck signal to the AFE 20, the lv_ck signal to the LVDS 30 as control signals.

During the standby mode or second mode, each of the DRV 2, the CCD 1, and the AFE 20 is supplied with a control signal from the TG 100 with different level from the control signal supplied during the normal operating mode, but the LVDS 30 is supplied with a control signal from the TG 100 with the same control signal supplied during the normal operating mode. For example, during the standby mode (second mode), the TG 100 supplies other control signals to the DRV and the AFE 20 while supplying the same lv_ck signal to the LVDS 30 used for the normal operating mode (first mode). With such a configuration, the operation of each unit can be shifted easily.

As for the image forming apparatus shown in FIG. 4, the operation of DRV 2, CCD 1, and AFE 20 can be stopped during the standby mode when the reference clock output from the PLL 11 is set to OFF by the switch 16.

Further, instead of using the switch 16, the operation of DRV 2, CCD 1, and AFE 20 can be stopped during the standby mode using a different configuration, in which the operation of ccdck_gen 12 and afeck_gen 13 can be stopped by supplying an operation OFF signal from the enable_ctl 17 (mode selector) to the ccdck_gen 12 and afeck_gen 13. As such, the enable_ctl 17 can be configured to supply the operation ON/OFF signal to the ccdck_gen 12 and the afeck_gen 13.

Further, instead of stopping the operation of DRV 2, CCD 1, and AFE 20 during the standby mode, the operation pattern of DRV 2, CCD 1, and AFE 20 during the standby mode can be changed from the operation pattern of DRV 2, CCD 1, and AFE 20 during the normal operating mode, which will be described later.

Further, when the AFE 20 stops its operation, image data input to the LVDS 30 becomes indefinite, but because the image data is not used during the standby mode (invalid data), such indefiniteness of data may not cause a problem.

A description is given of clamp (CLP) 21 disposed for the AFE 20. In typical image scanners, the output of CCD 1 is input to the AFE 20 via the capacitor 3 by conducting the alternating-current (AC) coupling. Such AC coupling is used because the reference voltage level of the CCD 1 and the reference voltage level of the AFE 20 may be different with each other. A direct current recovery is conducted for the AFE 20 to match the reference voltage level of image signal output from the CCD 1 to the reference voltage level in the AFE 20 as a clamp operation using a clamp or clamp circuit.

FIG. 5 shows an internal configuration of the CLP 21 of the AFE 20, and FIG. 6 shows a first example timing chart of the operation pattern of the CLP 21. As shown in FIG. 5, the CLP 21, for example, includes a buffer (buf) 211, a switch (sw) 212, and a clamp controller (clp_ctl) 213.

As shown in FIG. 6, the clp_ctl 213 can control ON/OFF of the switch 212 (sw 212) based on a signal (clp) generated by a logical product (or AND operation) of a clamp control signal (clpin) and a sample hold control signal (shd), output from the TG 100 as the afe_ck signal.

When the sw 212 is set ON, the clamp reference voltage (Vclp), supplied from a power source for the AFE 20, is input to the buf 211 via the resistance R. The analog image signal (sig), output from the CCD 1, is received by the capacitor 3 connected after the CCD 1. The capacitor 3 is charged or discharged so that the voltage level input to the AFE 20 after conducting the AC coupling by the capacitor 3 (Vcp) matches the clamp reference voltage (Vclp). As such, by using the charges accumulated in the capacitor 3, the voltage before the AC coupling and the voltage after the AC coupling can be clamped.

Typically, the AC coupling capacitance by the capacitor 3 is several µF (microfarads) or so, and the charge-and-discharge time constant becomes a product of ON-resistance of sw 212 and the AC coupling capacitance, which is, for example, several ms (milliseconds) or so.

Further, as shown in FIG. 6, the clamp operation is conducted at a given time period in one line and a given time period in one pixel during the normal operating mode, wherein the one line may be one line extending in the main scanning direction.

Further, during the standby mode, the clamp operation is not conducted because the clock signal is stopped (i.e., fixed at low level "L"). Therefore, if the clamp operation is not conducted during the standby mode, when returning to the normal operating mode from the standby mode, it is required to conduct the clamp operation for the AFE 20 and to wait the stabilization of the voltage input to the AFE 20.

When the clamp operation is conducted during the normal operating mode, the time period for the clamp operation in one line may be relatively short such as one percent of the total time of one line. However, the charging or discharging of the capacitor 3 used for the AC coupling to stabilize input voltage to the AFE 20 (i.e., clamp operation) may need the time of several hundreds msec (milliseconds), which may be referred to as clamp voltage following time. Accordingly, the return to the normal operating mode cannot be conducted with high speed if the clamp operation is not conducted during the standby mode. The analog image signal (sig) in FIG. 6 is a signal having a given direct current level when the CCD 1 stops its operation.

In view of such return speed issue, the clamp operation may be preferably conducted during the standby mode by the CLP 21 of the AFE 20 as similar to the normal operating mode. To conduct the clamp operation as similar to the normal operating mode during the standby mode, the AFE 20 requires the clamp control signal (clpin) and sample hold control signal (shd) transmitted from the afeck_gen 13 as the afeck_ck signal.

Accordingly, the clamp operation can be conducted during the standby mode if the afeck_gen 13 is connected to the PLL 11 during the standby mode by setting the switch 16 to ON in the configuration of FIG. 4, in which a signal output from the PLL 11 is supplied to the afeck_gen 13, and then the afeck_ck signal including the clpin and shd can be constantly output from the afeck_gen 13 to the AFE 20.

However, if the afeck_gen 13 is connected to the PLL 11 during the standby mode, the afeck_gen 13 conducts clock operation and consumes a large amount of power during the standby mode, which is an undesirable condition for the present invention.

In view of such undesirable situation caused by connecting the afeck_gen 13 to the PLL 11 during the standby mode, the clamp operation of AFE 20 during the standby mode is conducted without the clock operation to reduce the power consumption as follows, in which the afeck_gen 13 is not connected to the PLL 11. A description is given of improved clamp operation of AFE 20 with reference to FIGS. 7 and 8.

FIG. 7 shows a second example timing chart of operation pattern of the CLP 21, and FIG. 8 shows a third example timing chart of operation pattern of the CLP 21. FIGS. 7 and 8 show example cases that the CLP 21 conducts the clamp operation during the standby mode to shorten the clamp voltage following time when the mode is changed to the normal operating mode from the standby mode.

Specifically, as shown in FIG. 7, during the normal operating mode, the clamp signal (clp) generated by the clp_ctl 213 is a logical product (i.e., AND operation) of the clamp control signal (clpin) and the sample hold control signal (shd) as similar to FIG. 6.

In contrast, during the standby mode, the sample hold control signal (shd) is set at a given constant level such as high (H), and the clamp control signal (clpin) is generated as a gate signal by conducting the AND operation of the shd and clpin as shown in FIG. 7. Such clamp signal (clp), generated by the clp_ctl 213 as a logical product, becomes the same as the clamp control signal (clpin), and the clamp operation can be conducted at a given time period in one line corresponding to the clamp signal (clp) generated by the clp_ctl 213 during the standby mode.

By conducting the clamp operation during the standby mode, the waiting time for charge-and-discharge for AC coupling can be shortened when returning to the normal operating mode. Therefore, it is not required to wait the stabilization of clamp operation for a long time when returning to the normal operating mode from the standby mode, and thereby the return to the normal operating mode can be conducted with high speed.

Further, as shown in FIG. 7, the sample hold control signal (shd) is used for a clock operation during the normal operating mode. Further, the CCD 1 stops its operation and the analog image signal (sig) becomes a given direct current level during the standby mode, and the sample hold control signal (shd) is fixed at high (H). As such, by stopping the clock operation, an increase of power consumption during the standby mode can be avoided.

When returning to the normal operating mode from the standby mode, the drive signal (CCD_CK), input to the CCD 1, transitionally changes from "stop" to "input" (stop→input), by which the output signal (sig) output from the CCD 1 may temporarily behave disruptively. In such a case, problems may not occur at the CCD 1. However, such disruptive behavior of the output signal (sig) can be transmitted to the AFE 20 because of AC coupling for the AFE 20 via the capacitor 3, and the disruptive behavior of the output signal (sig) may cause the over-voltage/over-current at the AFE 20.

In view of such over-voltage/over-current, a preferable clamp operation may be conducted as shown in FIG. 8, in which the clamp operation may be constantly conducted by setting the sample hold control signal (shd) at high (H) and the clamp control signal (clpin) at high (H) during the standby mode, in which the shd and clpin signals are fixed at high (H). With such setting, a high pass filter can be configured using the AC coupling by the capacitor 3 and the ON-resistance of the sw 212. Therefore, even if the disruptive signal (sig) is input to the AFE 20, the disruptive signal can be adjusted to the clamp reference voltage (Vclp), and thereby the over-voltage/over-current can be prevented.

Further, because the clamp operation is constantly conducted during the standby mode as shown in FIG. 8, as similar to FIG. 7, it is not required to wait the stabilization of clamp operation when returning to the normal operating mode from the standby mode, and the power consumption may not increase during the standby mode.

As such, by conducting the clamp operation during the standby mode without the clock operation, it is not required to wait the stabilization of clamp voltage when returning to the normal operating mode from the standby mode, and thereby the return to the normal operating mode can be conducted with high speed. Further, by conducting the clamp operation constantly during the standby mode, the over-voltage/over-current may not occur to the AFE 20 when returning to the normal operating mode from the standby mode.

In cases of FIGS. 7 and 8, when the mode is shifted from the normal operating mode to the standby mode, the setting of the clamp control signal (clpin) and/or the sample hold control signal (shd) output from the TG 100 are changed for the standby mode. However, if a gate signal without clock operation is used as a control signal, the afeck_gen 13 can generate such gate signal using its previously described function of the afeck_gen 13 and high/low output. Further, such control signal may not be generated at the afeck_gen 13 but can be generated at the AFE 20, in which the TG 100 supplies a signal to the AFE 20 to generate such control signal at the AFE 20.

A description is given of CCD 1 shown in FIG. 4. In an example embodiment, the CCD drive signal (ccd_ck) is stopped during the standby mode, and such output voltage level of the CCD 1 during the standby mode may become an indefinite or unstable level, and thereby the output voltage of the CCD 1 during the standby mode may not be the same level of the normal operating mode. Such indefinite output voltage of the CCD 1 may occur because the output voltage of the CCD 1 is determined by the clamp operation of an output circuit of the CCD 1.

FIG. 9 shows an example configuration of circuit diagram of an output circuit of the CCD 1, and FIG. 10 shows a first example timing chart of operation pattern of the output circuit of the CCD 1 of FIG. 9. As shown in FIG. 9, the CCD 1 includes a capacitor 101 having charge detection capacity (Cfj), an amplifier (amp) 102, a capacitor 103, a buffer (buf) 104, a transistor 105, a transistor 106, a capacitor 107, a capacitor 108, and a transistor 109.

As for the CCD 1, charges generated by the photoelectric conversion are transferred using a transfer register for each pixel. The transferred charges are output to the capacitor 101 having the charge detection capacity (Cfj), and the charges are converted to voltage (charge→voltage). After the conversion, the voltage signal is amplified by the amp 102, then buffered by the buffer (buf) 104 via the AC coupling by the capacitor 103, and then output as an image signal to other device or unit.

In the CCD 1, the signal "rs" is a clock signal to reset charges accumulated in the capacitor 101 via the transistor 105, which is conducted for each pixel. The signal "cp" is a clock signal to clamp the voltage level of CCD 1 at a given level via the transistor 106 after resetting the capacitor 101, which is conducted for each pixel. The signal "Vrs" is the reset reference voltage, and the signal "Vcp" is the clamp reference voltage, wherein the clamp reference voltage Vcp determines the output level of the CCD 1 (direct current offset level).

Typically, the clock signals (rs, cp) are not input from an external unit. Specifically, a signal of low level "L" is converted to a signal having a given voltage increased from the low level "L" by using the AC coupling of the capacitors 107 and 108, and such converted signal can be used as the clock signals (rs, cp). Such voltage increase is required because the CCD 1 is made of negative-channel metal oxide semiconductor (NMOS) and operated using a high voltage power such as 10 V (volts).

To prepare the clock signals (rs, cp), the low level "L" is required to be increased, and such increasing operation can be conducted by clamping a given low level "L" using the transistor 109, which is operable by a shift gate drive signal such as a shift gate pulse (sh). The shift gate pulse (sh) is a pulse useable for transferring charges for entire pixels accumulated in photodiodes to the transfer register via a shift gate, and further, the shift gate pulse (sh) can be used as a pulse for the clamp control of low level "L" for the clock signals (rs, cp).

As for the configuration shown in FIG. 4, during the normal operating mode, the clock signals (rs, cp) having normal signals are input to set the normal operating mode or normal driving mode, and the CCD 1 outputs the image signal (sig) as shown in FIG. 10.

However, during the standby mode, the clock signals are stopped for signals (rs, cp) and the signals (rs, cp) fixed at low (L). Because the clock signal for (cp) is stopped, the output of the buffer (buf) 104, which is the outputting end of the CCD 1, becomes indefinite, and thereby the output voltage of the CCD 1 becomes indefinite or unstable.

Therefore, even if the clamp operation is conducted at the AFE 20 during the standby mode as above explained with reference to FIGS. 7 and 8, the input voltage to the AFE 20 may deviate from a normal level when the mode returns to the normal operating mode from the standby mode because the output voltage of the CCD 1 to be input to the AFE 20 is indefinite or unstable.

In view of such deviation of input voltage to the AFE 20, the output voltage of the CCD 1 during the standby mode may be preferably set to the same output level of the CCD 1 used for the normal operating mode (direct current offset level). To set the output voltage of the CCD 1 during the standby mode at the same output level of the CCD 1 used for the normal operating mode, the DRV 2 requires the clock signals (rs, cp) and the shift gate pulse (sh) used for the normal operating mode.

Accordingly, the output voltage of the CCD 1 during the standby mode can be set to the same output level of the CCD 1 during the normal operating mode if the ccdck_gen 12 is connected to the PLL 11 during the standby by setting the switch 16 to ON in the configuration of FIG. 4, in which a signal output from the PLL 11 is supplied to the ccdck_gen 12 as ccd_ck, and then the CCD_Ck can be constantly output from the ccdck_gen 12 to the CCD 1.

However, if the ccdck_gen 12 is connected to the PLL 11 during the standby mode, the ccdck_gen 12 conducts clock operation and consumes a large amount of power during the standby mode, which is an undesirable condition for the present invention.

In view of such undesirable situation caused by connecting the ccdck_gen 12 to the PLL 11 during the standby mode, the voltage control operation of CCD 1 during the standby mode may be conducted as follows. A description is given of improved voltage control operation of CCD 1 with reference to FIG. 11. FIG. 11 shows an example case that the CCD 1 conducts the voltage control operation during the standby mode to shorten the clamp voltage following time when the mode is changed to the normal operating mode.

FIG. 11 shows a second example timing chart of operation pattern of the output circuit of the CCD 1. Specifically, in a case of FIG. 11, the signals (rs, cp) during the standby mode are inverted with respect to the shift gate pulse (sh) and delayed for the time "td" with respect to the shift gate pulse (sh). The signals (rs, cp) during the standby mode is inverted to set the same polarity for the signals (rs, cp), and the signals (rs, cp) during the standby mode is delayed to effectively secure the enough time to clamp the signals (rs, cp) at the low level "L" using the shift gate pulse (sh). As shown in FIG. 11, the delay time "td" corresponds from the negate (↓) of the shift gate pulse (sh) to the assert (↑) of the clock signals (rs, cp).

In a case of FIG. 11, because the signals (rs, cp) is almost set at high level (H), and the reset operation/clamp operation can be constantly conducted, the output voltage of the CCD 1 during the standby mode can be maintained at almost the same level of the output voltage of the CCD 1 used for the normal operating mode, which may be referred to as the clamp reference voltage Vcp. Further, because the low level "L" for the signals (rs, cp) is clamped for each line when the shift gate pulse (sh) is set, the reset operation/clamp operation can be stably conducted over the time.

It should be noted that if the signals (rs, cp) is constantly set at high H too long, the low level "L" changes gradually, by which the reset operation/clamp operation cannot be conducted in a normal manner over the time.

Further, the voltage control operation of CCD 1 may be conducted differently as shown in FIG. 12. FIG. 12 shows a third example timing chart of operation pattern of the output circuit of the CCD 1, in which the voltage control operation of CCD 1 may be conducted by connecting the ccdck_gen 12 to the PLL 11 during the standby mode. Although such electrical connection during the standby mode is different from other above described example embodiments without having the electrical connection during the standby mode, such electrical connection using configuration can be effective for the voltage control operation of CCD 1 as follows.

In a case of FIG. 12, the shift gate pulse (sh) during the standby mode is set same as the shift gate pulse (sh) used for the normal operating mode while the frequency of the clock signals (rs, cp) during the standby mode is set lower than the frequency of the clock signals (rs, cp) used for the normal operating mode. With such settings, the output voltage of the CCD 1 during the standby mode can be set almost the same level of the output level of the CCD 1 during the normal operating mode, which is referred to as the clamp reference voltage Vcp.

Therefore, the clamp operation can be effectively conducted for the AFE 20 even during the standby mode because the output voltage of the CCD 1 during the standby mode, to be input to the AFE 20, can be set at a stable level. Therefore, while reducing the power consumption, the waiting time for AC coupling charge-and-discharge when returning to the normal operating mode can be shortened effectively. However, in a case of FIG. 12, because the clock operation using the lower frequency is conducted for the signals (rs, cp) during the standby mode, such clock operation may increase the power consumption although the increased amount of power consumption may be small.

By employing the configurations used for FIGS. 11 and 12, the waiting time for charge-and-discharge for AC coupling when returning to the normal operating mode can be shortened effectively while reducing the power consumption of apparatus.

As above described, by conducting the reset operation/clamp operation without the clock operation during the standby mode (FIG. 11) or by setting a lower frequency for clock signal during the standby mode (FIG. 12), the output voltage of the CCD 1 during the standby mode can be set at the substantially same output level of the CCD 1 during the normal operation. By using such output voltage of the CCD 1 as the input voltage to the AFE 20, the deviation of clamp operation for AFE 20 can be prevented. Therefore, when returning to the normal operating mode from the standby mode, the waiting time for stabilizing the clamp operation for AFE 20 can be effectively shortened, and in particular can be omitted.

In cases of FIGS. 11 and 12, when the mode is shifted from the normal operating mode to the standby mode, the setting of the signals (rs, cp) and the shift gate pulse (sh) output from the TG 100 are changed for the standby mode. However, if a gate signal without clock operation is used as a control signal, the ccdck_gen 12 can generate such gate signal using its previously described function of the ccdck_gen 12 and high/low output. Further, such control signal may not be generated at the ccdck_gen 12 but can be generated at the DRV 2 or CCD 1, in which the TG 100 supplies a signal to the DRV 2 to generate such control signal at the DRV 2 or CCD 1.

Figure 13:
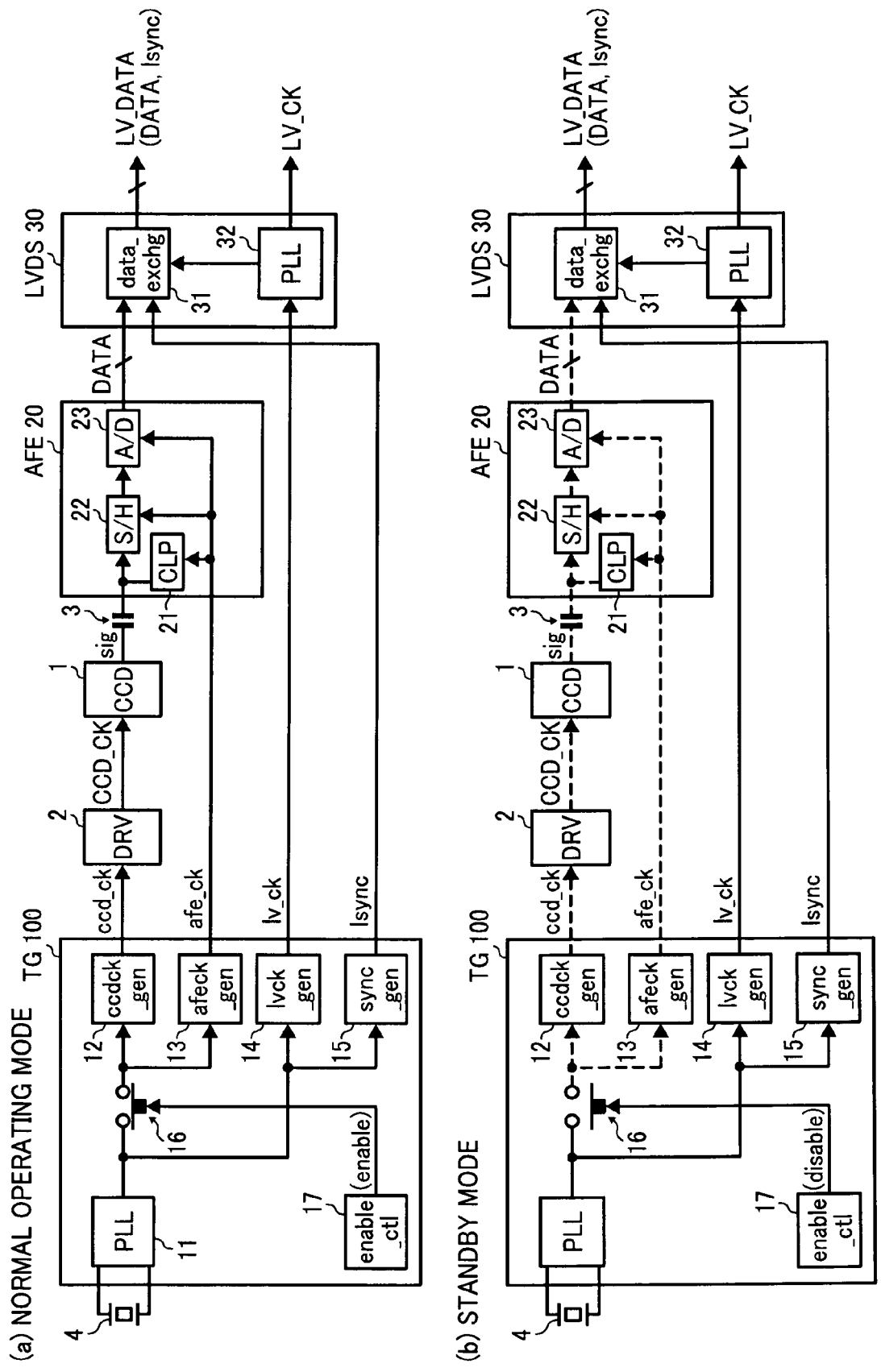
FIG. 13(a) shows a block diagram of the signal processing circuit during the normal operating mode.
FIG. 13(b) shows a block diagram of the signal processing circuit during the standby mode.

As above described, the signal processing circuit according to an example embodiment useable for an image scanner can function as shown in FIGS. 13(a) and 13(b). FIG. 13(a) shows a block diagram of the signal processing circuit during the normal operating mode, and FIG. 13(b) shows a block diagram of the signal processing circuit during the standby mode. Specifically, as shown in FIG. 13(a), during the normal operating mode, the enable_ctl 17 in the TG 100 sets the switch 16 at ON, by which the reference clock output from the PLL 11 is supplied to the ccdck_gen 12, the afeck_gen 13, the lvck_gen 14, and the sync_gen 15, and thereby the TG 100, the DRV 2, the CCD 1, the AFE 20, and the LVDS 30 can be operated normally.

Further, as shown in FIG. 13(b), during the standby mode, the enable_ctl 17 in the TG 100 sets the switch 16 at OFF, in which the reference clock output from the PLL 11 is supplied to the lvck_gen 14 and the sync_gen 15, but not supplied to the ccdck_gen 12 and the afeck_gen 13. In such a case, the TG 100, the DRV 2, the CCD 1, and the AFE 20 are set at the stop condition (clock-stop operation), which is different from the normal operating mode, while the LVDS 30 can be operated as same as the normal operating mode to constantly supply clock signal and synchronization signal to a later-stage unit such as an image processing unit disposed after the LVDS 30.

With such a configuration, while the unnecessary power consumption during the standby mode can be reduced, the return to the normal operating mode from the standby mode can be conducted with high speed.

Further, a following configuration omitting the enable_ctl 17 and the switch 16 in the TG 100 can be devised, in which the ccdck_gen 12 and the afeck_gen 13 can be configured to block or stop a clock signal output from the ccdck_gen 12 and the afeck_gen 13 but to output other signals to control a later stage unit or device.

In such configuration, the ccdck_gen 12 and the afeck_gen 13 are connected to the PLL 11, and the reference clock output from the PLL 11 can be supplied to the ccdck_gen 12 and the afeck_gen 13 even during the standby mode. However, if the ccdck_gen 12 or the afeck_gen 13 are configured not to output clock signals during the standby mode but to generate a gate signal by combining high/low output of the ccdck_gen 12 or the afeck_gen 13 as a control signal without clock operation, the output voltage of the CCD 1 during the standby mode can be set at the same output level of the CCD 1 used for the normal operating mode as similar to the clamp operation of FIGS. 11 and 12, and further the clamp operation for the AFE 20 can be conducted constantly as explained with reference to FIGS. 7 and 8.

In such a configuration, because the clock operation at the CCD 1 and the AFE 20 during the standby mode can be reduced or omitted, the power consumption during the standby mode can be reduced.

Further, it is not required to wait the stabilization of the operation of the PLL 32 and the stabilization of later-stage unit such as an image correction circuit, and it is not required to wait the stabilization of the clamp operation for the AFE 20. Therefore, when the scan operation instruction is received during the standby mode, the operation can be returned to the normal operating mode promptly.

As above described, the signal processing circuit according to an example embodiment can be applied to a scanner or image scanner using a CCD to scan document image. Further, the above described signal processing circuit can be applied to other image scanner using other image sensor to scan document image. Further, the above described signal processing circuit can be applied to an image scanner used with image forming apparatuses such as digital copiers, facsimile machines, printers, or the like. Such image forming apparatuses can be used to print image data transmitted from the image scanner, as a visible image on a sheet such as paper.

Further, the above described signal processing circuit can be applied to a signal processing circuit, device, or apparatus which includes a load generating unit other than an image sensor. Further, the above described signal processing circuit can be applied to electronic devices or apparatuses other than an image scanner and an image forming apparatus. By applying the signal processing circuit according to an example embodiment, electronic devices or apparatuses such as image scanner and image forming apparatus can be operated effectively with high reliability.

Figure 14:
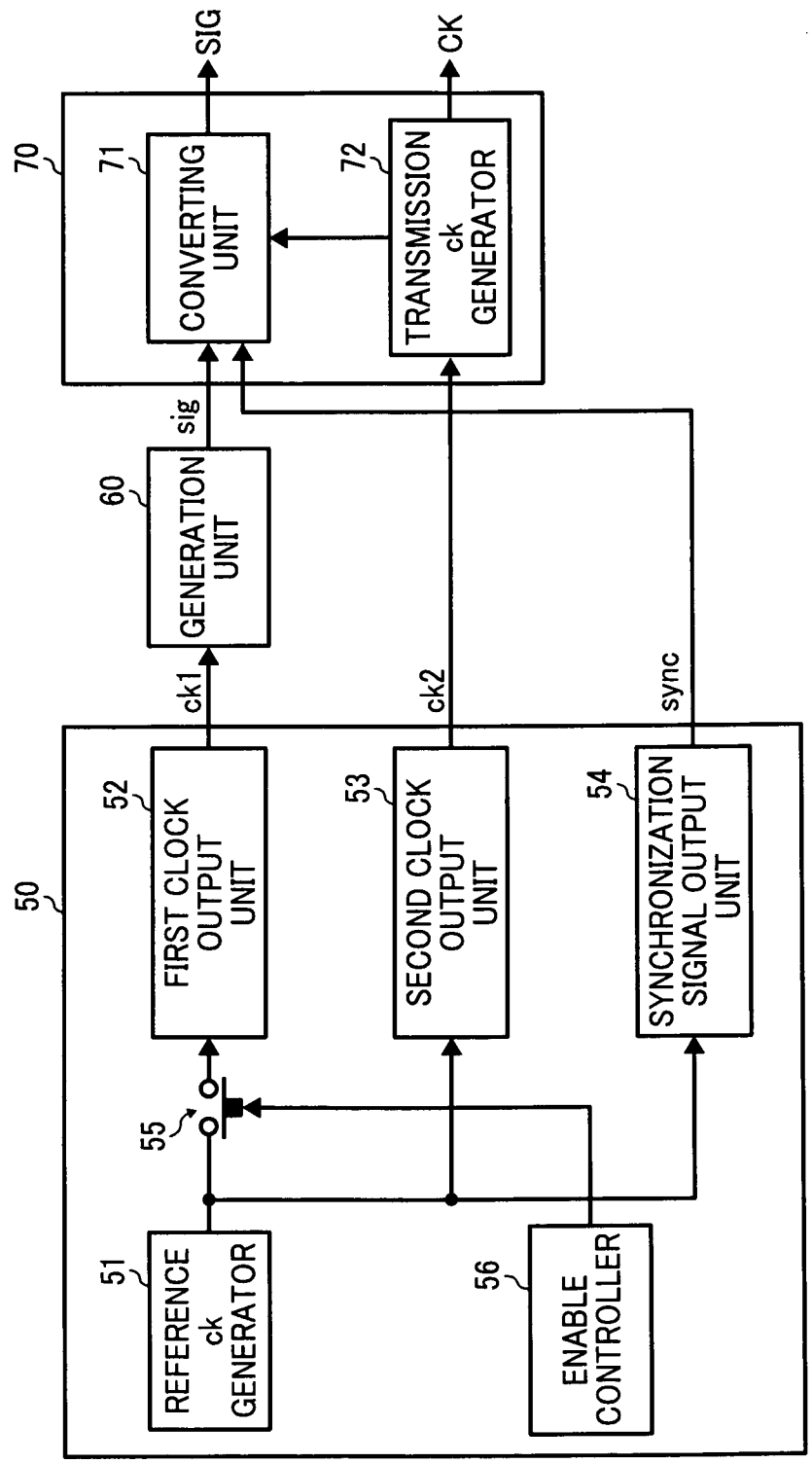
FIG. 14 shows a basic configuration of a circuit diagram of signal processing circuit according to an example embodiment.

The signal processing circuit according to an example embodiment can be applied as a signal processing circuit as shown in FIG. 14 having a control unit 50, a generation unit 60, and a transmission unit 70, in which the above described effect can be devised for the signal processing circuit. A description is given of the signal processing circuit shown in FIG. 14.

FIG. 14 shows a circuit diagram of a signal processing circuit according to an example embodiment. The above described signal processing circuit shown in FIG. 4 is one example of the signal processing circuit shown in FIG. 14. The signal processing circuit including the control unit 50, the generation unit 60 such as a signal generator, and the transmission unit 70 can be applied to electronic devices or apparatuses including an image scanner and an image forming apparatus.

The control unit 50 includes a reference clock (ck) generator 51, a first clock output unit 52, a second clock output unit 53, a synchronization signal output unit 54, a switch 55, and an enable controller 56.

The reference clock generator 51, which generates reference clock, may correspond to the PLL 11 of FIG. 4. The first clock output unit 52 outputs a first clock ck1 based on the reference clock received from the reference clock generator 51. The second clock output unit 53 outputs a second clock ck2 based on the reference clock received from the reference clock generator 51. The first clock output unit 52 may correspond to the ccdck_gen 12 and the afeck_gen 13 of FIG. 4, and second clock output unit 53 may correspond to the lvck_gen 14 of FIG. 4.

The synchronization signal output unit 54 outputs a synchronization signal "sync" based on the reference clock received from the reference clock generator 51. The synchronization signal output unit 54 may correspond to the sync_gen 15 of FIG. 4.

The enable controller 56, which is an enable control unit, controls the switch 55 at ON during the normal operating mode, and at OFF during the standby mode. The enable controller 56 may correspond to the enable_ctl 17 of FIG. 4.

The generation unit 60, which is a generator or signal generator, generates a given signal (sig) such as image signal based on the first clock ck1 received from the first clock output unit 52. Such signal (sig) may be referred to as process-required signal such as image signal to be processed by a given unit such as an image processing unit. The generation unit 60 may correspond to at least one of the DRV 2 and the CCD 1 of FIG. 4.

The transmission unit 70 includes a converting unit 71 and a transmission clock (ck) generator 72. The converting unit 71, which is a converter, converts a signal transmitted from the generation unit 60 based on a transmission clock received from the transmission clock generator 72. Further, the converting unit 71 transmits or transfers such converted signal "SIG" to other device or unit with the synchronization signal "sync" received from the synchronization signal output unit 54. The converting unit 71 may correspond to the data exchanger 31 of LVDS 30 of FIG. 4.

The transmission clock generator 72, which is a transmission clock generator, generates a transmission clock based on the second clock ck2 received from the second clock output unit 53, and transmits or transfers such transmission clock "CK" to other device or unit. The transmission clock generator 72 may correspond to the PLL 32 of LVDS 30 of FIG. 4.

In such configured signal processing circuit shown in FIG. 14, the enable controller 56 sets the switch 55 at ON during the normal operating mode, in which the reference clock output from the reference clock generator 51 is supplied to the first clock output unit 52, the second clock output unit 53, and the synchronization signal output unit 54, and thereby the generation unit 60 and the transmission unit 70 can be operated normally.

Further, the enable controller 56 sets the switch 55 at OFF during the standby mode, in which the reference clock output from the reference clock generator 51 is not supplied to the first clock output unit 52 and the generation unit 60, and thereby the generation unit 60 is stopped. Therefore, the total power consumption of signal processing circuit can be reduced for the amount of power consumption of the generation unit 60.

As such, in the above example embodiment, the clock operation for a load generating device such as CCD can be effectively stopped during the standby mode by stopping or reducing the supply of clock signal from a timing generator to the load generating device, by which the total power consumption of signal processing circuit can be reduced.

Figure 3:
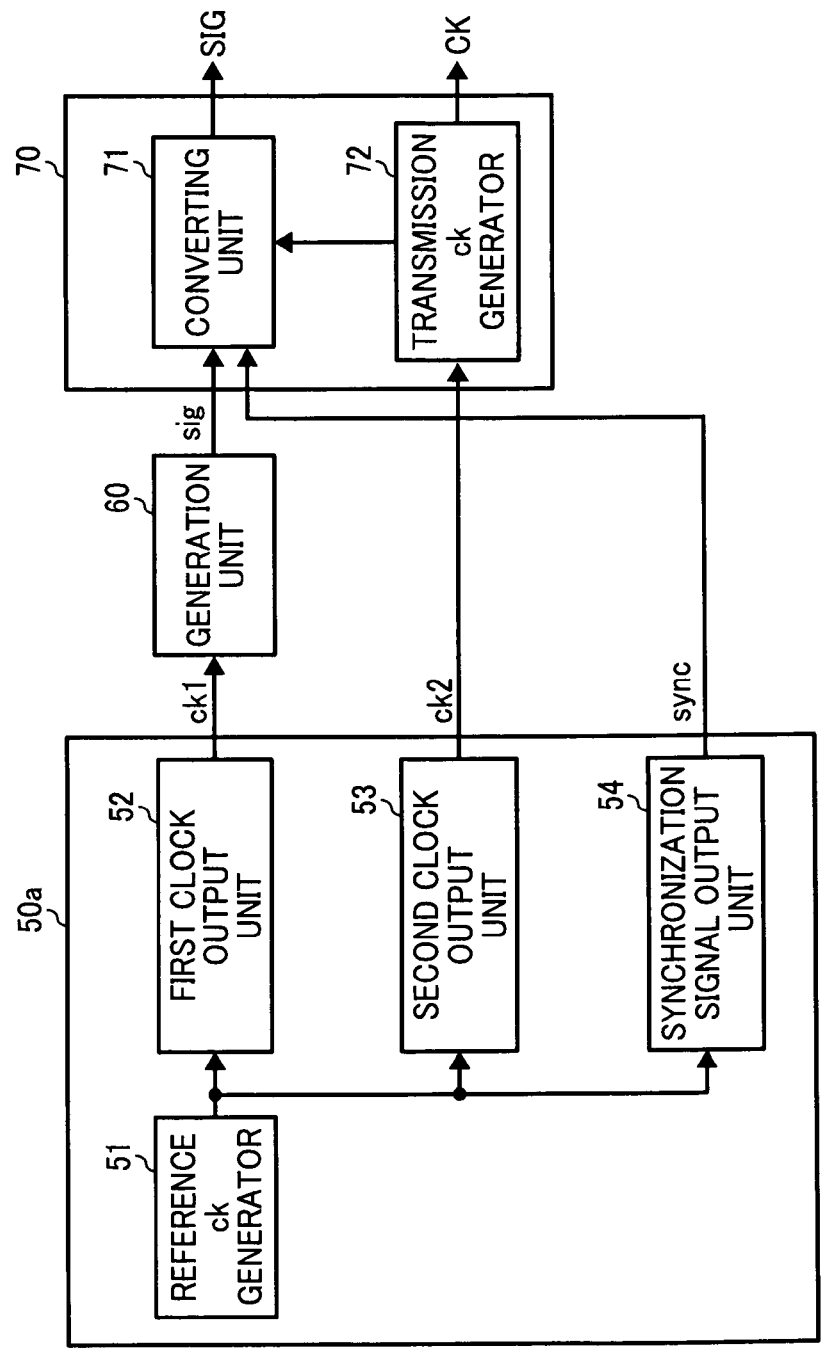
FIG. 3 shows a basic configuration of circuit diagram of a conventional signal processing circuit.

In contrast, a conventional signal processing circuit (see FIG. 3), includes a control unit 50a, in which each unit is supplied with power during the normal operating mode and standby mode. In such configuration, although a normal operation is not conducted during the standby mode, the power is consumed during the standby mode at a similar level of the normal operation, wherein such power consumption during the standby mode may be undesirable as explained with reference to FIG. 1.

Figure 15:
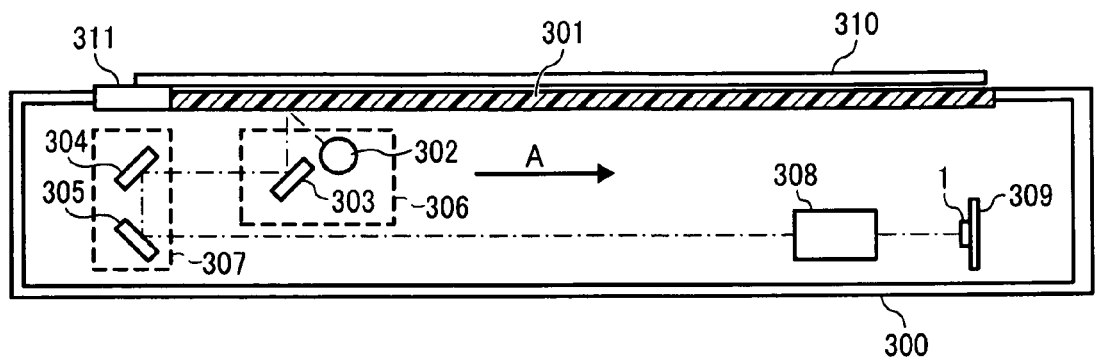
FIG. 15 shows a schematic configuration of a scanner employing a signal processing circuit according to example embodiments.

FIG. 15 shows a schematic configuration of a scanner 300 employing the signal processing circuit according to the above described example embodiment, and same reference characters and numbers in FIG. 4 are used for the same parts in FIG. 15 such as CCD 1. The scanner 300 may be a flat bed type, which includes a contact glass 301 at a top face of the scanner 300 on which document is placed. Under the contact glass 301, a first carriage 306 and a second carriage 307 are disposed, wherein the first carriage 306 and second carriage 307 can move in a direction shown by an arrow A (in the sub-scanning direction) with a speed ratio of, for example, two to one.

The first carriage 306 includes a halogen lamp 302 used as a light source, and a first mirror 303. The second carriage 307 includes a second mirror 304 and a third mirror 305. The halogen lamp 302 irradiates light onto the document. The light reflected from the document is reflected at the first mirror 303, the second mirror 304, and the third mirror 305, and then enters a focus lens 308. The light is focused by the focus lens 308 on a focus face of CCD 1 used as a linear image sensor. The CCD 1 conducts photo-electric conversion to generate analog electrical signals, and the analog electrical signals are converted to digital image data (document image data) by a signal processing circuit 309 employing the above described example embodiment, and the digital image data is transmitted to other subsequent units.

To secure a uniform distribution of document image data in the main scanning direction, which is perpendicular to the sub-scanning direction, a shading correction is required, in which scanning data of a white platen 311 is required. The shading correction can be conducted as follows. Before scanning document image, the halogen lamp 302 irradiates light onto a surface of the white platen 311 to scan the surface of white platen 311, and based on such scanning result, the shading correction for document image scanning can be conducted.

The first carriage 306 and second carriage 307 can move in the sub-scanning direction with a speed ratio of two to one to secure the light-path distance from the document face to the focus face of the CCD 1 at a constant level, and the CCD 1 is mounted on the signal processing circuit 309. Further, a pressing plate 310 is disposed over the contact glass 301, wherein the pressing plate 310 can be opened and closed. After placing the document on the contact glass 301, the pressing plate 310 is closed so that no external light enters the CCD 1. Further, instead of the pressing plate 310, an automatic document feeder (ADF) or an automatic reversing document feeder (ARDF) can be disposed to automatically feed document.

Figure 16:
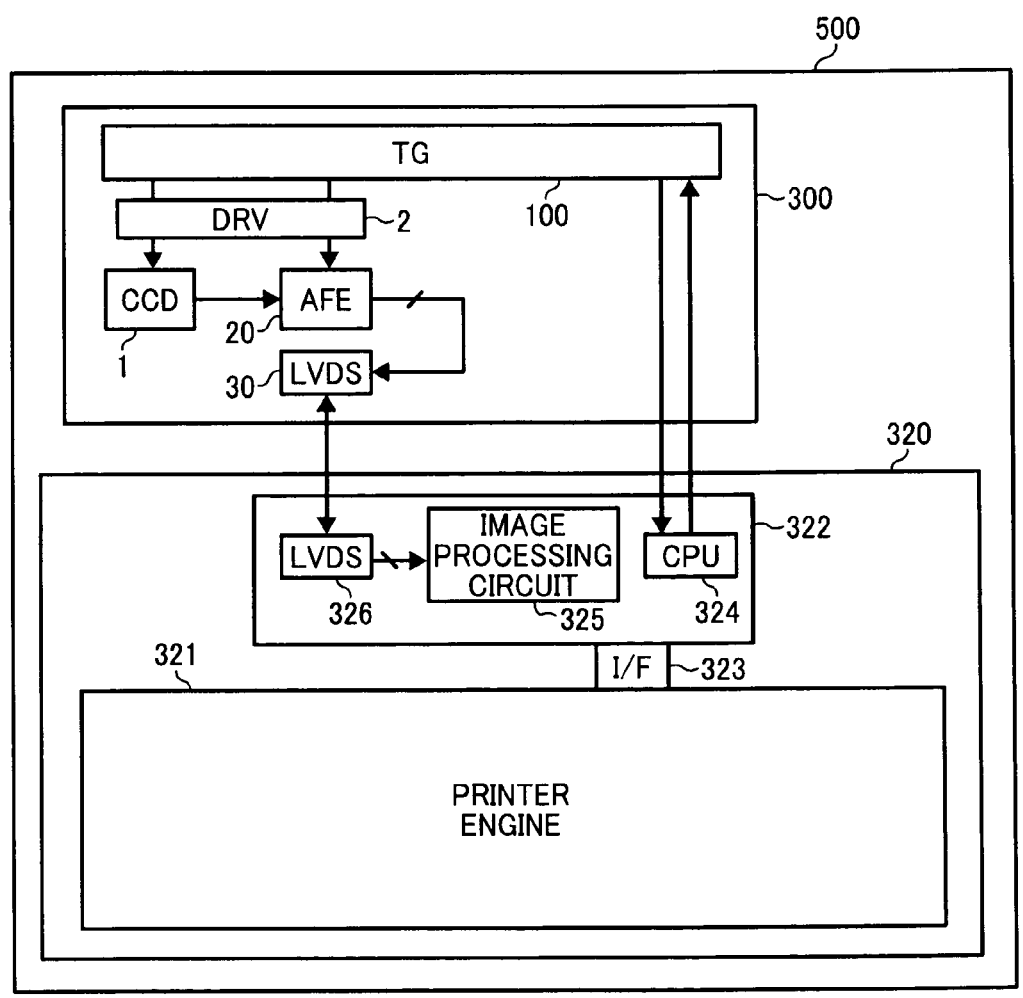
FIG. 16 shows a schematic configuration of an image forming apparatus having a scanner employing a signal processing circuit according to an example embodiment.

FIG. 16 shows a schematic configuration of an image forming apparatus 500 having a scanner employing the signal processing circuit of above described example embodiment, and same reference characters and numbers in FIG. 4 and FIG. 15 are used for the same parts in FIG. 16. The image forming apparatus 500 includes a scanner 300 and a printer 320. The scanner 300 includes a signal processing circuit of the above described example embodiments having the TG 100, the CCD driver 2, the CCD 1, the AFE 20, and the LVDS 30. When a parallel digital data of 10-bit, a line synchronization signal, a clock signal are transmitted from the AFE 20 to the LVDS 30 used as data transmitter, the LVDS 30 transmits such data and signal to a LVDS 326, used as data receiver, of the printer 320 in a serial manner.

The printer 320 includes a printer engine 321 and a control unit 322 to control the printer engine 321, and an interface (I/F) 323 connecting the printer engine 321 and the control unit 322 to communicate information with each other. The control unit 322 includes a CPU 324, an image processing circuit 325, and the LVDS 326. The CPU 324 is connected with the TG 100 to communicate information with each other. Based on digital image data input via the LVDS 326, the CPU 324 controls the printer engine 321 to form images on a recording medium such as sheet. The image forming processes conduct-able by the printer engine 321 includes various types, and because any types of image forming processes can be conducted by a printer engine, the explanation of printer engine is omitted.

Further, the printer 320 includes the printer engine 321 and a control unit 322, which are connected to each other using the I/F 323. The control unit 322 controls the printer engine 321. The control unit 322 includes the CPU 324, the image processing circuit 325, and the LVDS 326. When the LVDS 326 receives a digital image data, a line synchronization signal, and a clock signal transmitted from the LVDS 30 of the scanner 300 in a serial manner, the LVDS 326 converts such digital image data parallel 10-bit digital image data, and inputs such digital image data to the image processing circuit 325 with the line synchronization signal and clock signal.

When the image processing circuit 325 receives the parallel 10-bit digital image data, the line synchronization signal, and the clock signal from the LVDS 326, the image processing circuit 325 conducts various types of processing such image correction to the digital image data based on the line synchronization signal and clock signal. Then, the image processing circuit 325 outputs the digital image data to the printer engine 321, and the printer engine 321 conducts a printing operation of image on a sheet such as paper (image forming process). The CPU 324 is connected with the TG 100 of the scanner 300 to communicate information with each other, and controls the printer engine 321 and the scanner 300 as a whole.

By employing the signal processing circuit according to example embodiment to the scanner 300 of the image forming apparatus 500, the power consumption during the standby mode can be reduced, and when a print operation instruction is received during the standby mode, the image forming apparatus 500 can promptly return to the normal operating mode which is a printing mode.

As above described, the signal processing circuit according to example embodiment can be devised to reduce unnecessary power consumption while enabling the return to the normal operating mode with high speed. Therefore, by employing the signal processing circuit according to example embodiment to electronic devices and apparatuses such as image scanner and image forming apparatus, such devices and apparatuses can be used while reducing unnecessary power consumption and enabling the return to the normal operating mode with high speed.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A signal processing circuit configured to operate in at least a first mode and a second mode consuming relatively less power than the first mode, the signal processing circuit comprising:
    a timing controller including,
        a reference clock generator configured to generate a reference clock signal irrespective of whether the timing controller is operating in the first mode or the second mode,
        a plurality of first signal generators configured to generate, based on the reference clock, first control signals only if the signal processing circuit is operating in the first mode,
        a plurality of second signal generators configured to generate, based on the reference clock, second control signals if the signal processing circuit is operating in any one of the first mode and the second mode, and
        a mode selector to select and shift an operating mode of the signal processing circuit between the first mode and the second mode; and
    a data transmitter configured to transmit digital image data, a line synchronization signal and a differential clock signal to an image processing unit based on at least one of the second control signals such that the image processing unit receives and processes the line synchronization signal and a differential clock signal irrespective of whether the signal processing circuit is operating in the first mode or the second mode.

2. An image scanner configured to operate in at least a first mode and a second mode consuming relatively less power than the first mode, the image scanner comprising:
    a timing controller including,
        a reference clock generator configured to constantly generate a reference clock signal when the image scanner is operating in any of the first mode or the second mode,
        a plurality of first signal generators configured to generate, based on the reference clock, first control signals only if the image scanner is operating in the first mode,
        a plurality of second signal generators configured to generate, based on the reference clock, second control signals if the image scanner is operating in any one of the first mode and the second mode, and
        a mode selector to select and shift an operating mode of the image scanner between the first mode and the second mode;
    a photoelectric converter configured to photoelectrically convert light reflected from a document image to an image signal;
    a driving unit configured to drive the photoelectric converter based on one of the first control signals;
    an analog processing unit configured to conduct direct current recovery of the image signal received from the photoelectric converter and to convert the received image signal to digital image data based on one of the first control signals generated only if the image scanner is operating in the first mode; and
    a data transmitter configured to receive the digital image data from the analog processing unit and to transmit the digital image data, a line synchronization signal and a differential clock signal to an image processing unit based on at least one of the second control signals such that the image processing unit receives and processes the line synchronization signal and a differential clock signal irrespective of whether the image scanner is operating in the first mode or the second mode.

3. The image scanner of claim 2, wherein during the second mode, the timing controller does not supply the first control signals to the driving unit, and the analog processing unit, and supplies the same second control signals used to the data transmitter in both the first mode and the second mode.

4. The image scanner of claim 3, wherein the direct current recovery conducted by the analog processing unit is a clamp operation by alternating current (AC) coupling using charging and discharging, wherein during the first mode, the analog processing unit conducts the clamp operation at a given time period in one line and at a given time period at a given pixel in one line based on one of the first control signals transmitted from the timing controller, wherein during the second mode, the analog processing unit conducts the clamp operation at a given time period in one line without utilizing any of the first control signals.

5. The image scanner of claim 3, wherein the direct current recovery conducted by the analog processing unit is a clamp operation by alternating current (AC) coupling using charging and discharging, wherein during the first mode, the analog processing unit conducts the clamp operation at a given time period in one line and at a given time period at a given pixel in one line based on one of the first control signals transmitted from the timing controller, wherein during the second mode, the analog processing unit constantly conducts the clamp operation without utilizing any of the first control signals.

6. The image scanner of claim 2, wherein a control signal supplied to the photoelectric converter from the timing controller includes a shift gate drive signal and a clamp drive signal, wherein the shift gate drive signal is set at the same signal for the first and second modes, wherein the clamp drive signal used for the first mode is a clock signal set for a normal driving of the photoelectric converter, wherein the clamp drive signal used for the second mode is a signal inverted with respect to the shift gate drive signal and delayed from the shift gate drive signal.

7. The image scanner of claim 2, wherein a control signal supplied to the photoelectric converter from the timing controller includes a shift gate drive signal and a clamp drive signal, wherein the shift gate drive signal is set at the same signal for the first and second modes, wherein the clamp drive signal used for the first mode is a clock signal set for a normal driving of the photoelectric converter, wherein the clamp drive signal used for the second mode is a clock signal having a frequency lower than the clock signal used for the first mode.

8. An image forming apparatus, comprising:
the image scanner of claim 2; and
an image forming unit to conduct an image forming process based on image data scanned by the image scanner.

9. The image sensor of claim 2, wherein, at least one of the plurality of second signal generators is configured to provide one or more of the second control signals to a second reference clock generator included in the data transmitter such that the second reference clock generator receives the one or more of the second control signals irrespective of whether the image scanner is operating in the first mode or the second mode.

10. The image scanner of claim 2, wherein,
the reference clock generator is a first phase locked loop (PLL) circuit,
the mode selector is a switch connected between the first PLL circuit and the plurality of first signal generators, and
the plurality of second signal generators and the switch are in parallel.

11. The image sensor of claim 10, wherein the
the data transmitter includes a second PLL circuit, the second PLL circuit configured to generate the differential clock signal based on the second control signals, and
the first PLL circuit and the second PLL circuit are configured to generate their respective signals irrespective of whether the image scanner is operating in the first mode or the second mode.

12. The image sensor of claim 2, wherein when the image sensor is operating in the second mode, the analog processing unit is further configured to conduct the direct current recovery based on an internal signal generated within the analog processing unit and not based on one of the first control signals.

13. The image sensor of claim 12, wherein the photoelectric converter is configured to generate the image signal such that the image signal provided to the analog processing unit has a same DC voltage level in the first mode and the second mode.

14. The image sensor of claim 2, wherein the image processing unit is configured to perform image correction on the digital image data based on the line synchronization signal and the differential clock signal.

* * * * *